(12) United States Patent
Lim (10) Patent No.: US 7,420,775 B2
(45) Date of Patent: Sep. 2, 2008

(54) HARD DISK DRIVE

(75) Inventor: Hong-taek Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 263 days.

(21) Appl. No.: 11/159,180

(22) Filed: Jun. 23, 2005

(65) Prior Publication Data

US 2006/0002008 A1 Jan. 5, 2006

(30) Foreign Application Priority Data

Jul. 5, 2004 (KR) .................. 10-2004-0051976

(51) Int. Cl.
*G11B 33/14* (2006.01)
(52) U.S. Cl. .................. 360/97.03; 360/97.02
(58) Field of Classification Search .......... 360/97.02, 360/97.03, 97.04
See application file for complete search history.

(56) References Cited

U.S. PATENT DOCUMENTS

| | | | | |
|---|---|---|---|---|
| 5,541,791 A * | 7/1996 | Yamasaki et al. | ........ | 360/256.1 |
| 5,898,545 A | 4/1999 | Schirle | | |
| 6,542,328 B2 * | 4/2003 | Harrison et al. | ........ | 360/97.03 |
| 6,788,493 B1 * | 9/2004 | Subramaniam et al. | .. | 360/97.02 |
| 6,989,959 B2 * | 1/2006 | Chang et al. | ........ | 360/97.02 |
| 7,031,104 B1 * | 4/2006 | Butt et al. | ........ | 360/97.02 |
| 2002/0075591 A1 * | 6/2002 | Chang et al. | ........ | 360/97.02 |
| 2002/0149876 A1 * | 10/2002 | Sakata et al. | ........ | 360/97.02 |
| 2003/0072103 A1 * | 4/2003 | Kang et al. | ........ | 360/97.02 |
| 2003/0179493 A1 * | 9/2003 | Kim | ........ | 360/97.02 |
| 2005/0190488 A1 * | 9/2005 | Chan et al. | ........ | 360/97.02 |
| 2005/0270691 A1 * | 12/2005 | Pottebaum et al. | ........ | 360/97.02 |
| 2006/0028760 A1 * | 2/2006 | Zuo et al. | ........ | 360/97.02 |
| 2006/0114603 A1 * | 6/2006 | Ser et al. | ........ | 360/97.02 |
| 2006/0126218 A1 * | 6/2006 | Chen et al. | ........ | 360/97.02 |
| 2006/0146443 A1 * | 7/2006 | Chang et al. | ........ | 360/97.02 |

FOREIGN PATENT DOCUMENTS

| | | | |
|---|---|---|---|
| JP | 63269392 A | * | 11/1988 |
| JP | 3-83202 | | 4/1991 |
| JP | 5-28488 | | 2/1993 |
| JP | 5-151738 | | 6/1993 |
| JP | 2000357385 A | * | 12/2000 |
| KR | 10-2003-0009124 | | 1/2003 |
| KR | 2003-68261 | | 8/2003 |
| KR | 2003-70529 | | 8/2003 |
| KR | 2006057859 A | * | 5/2006 |

OTHER PUBLICATIONS

English Translation of Korean Patent Abstract Document 2003-68261 A (Hong Gwon Lee), Published Aug 21, 2003.*
Related Korean Office Action for Korean Patent Application No. 10-2004-0051976 dated Jan. 26, 2006.

* cited by examiner

*Primary Examiner*—William J Klimowicz
(74) *Attorney, Agent, or Firm*—Staas & Halsey LLP

(57) ABSTRACT

A hard disk drive (HDD) and method, with the HDD including a housing, having a base member and a cover member attached to each other, a plurality of disks, rotatably stacked on the base member and spaced apart from one another, an actuator installed on the base member to rotate around a pivot and fixedly supporting, on its leading end, a slider on which a magnetic head for recording or reproducing data to or from the disks is mounted, and a damper, disposed between the stacked disks, wherein a groove is formed on surfaces of the damper facing the disks.

21 Claims, 7 Drawing Sheets

HARD DISK DRIVE

CROSS-REFERENCE TO RELATED APPLICATIONS

This application claims the priority benefit of Korean Patent Application No. 2004-51976, filed on Jul. 5, 2004, in the Korean Intellectual Property Office, the disclosure of which is incorporated herein in its entirety by reference.

BACKGROUND OF THE INVENTION

1. Field of the Invention

The present invention relates to a hard disk drive (HDD), and more particularly, to an HDD and method for suppressing turbulence during the rotation of a HDD disk.

2. Description of the Related Art

Hard disk drives (HDDs), which are auxiliary memory devices for computers, reproduce information stored in a magnetic disk or record new information on the magnetic disk by way of a magnetic head. There have been demands for HDDs to have higher capacity and operate at higher speeds with lower vibrations. To meet these demands, extensive research and development efforts have been made.

Figure 1:
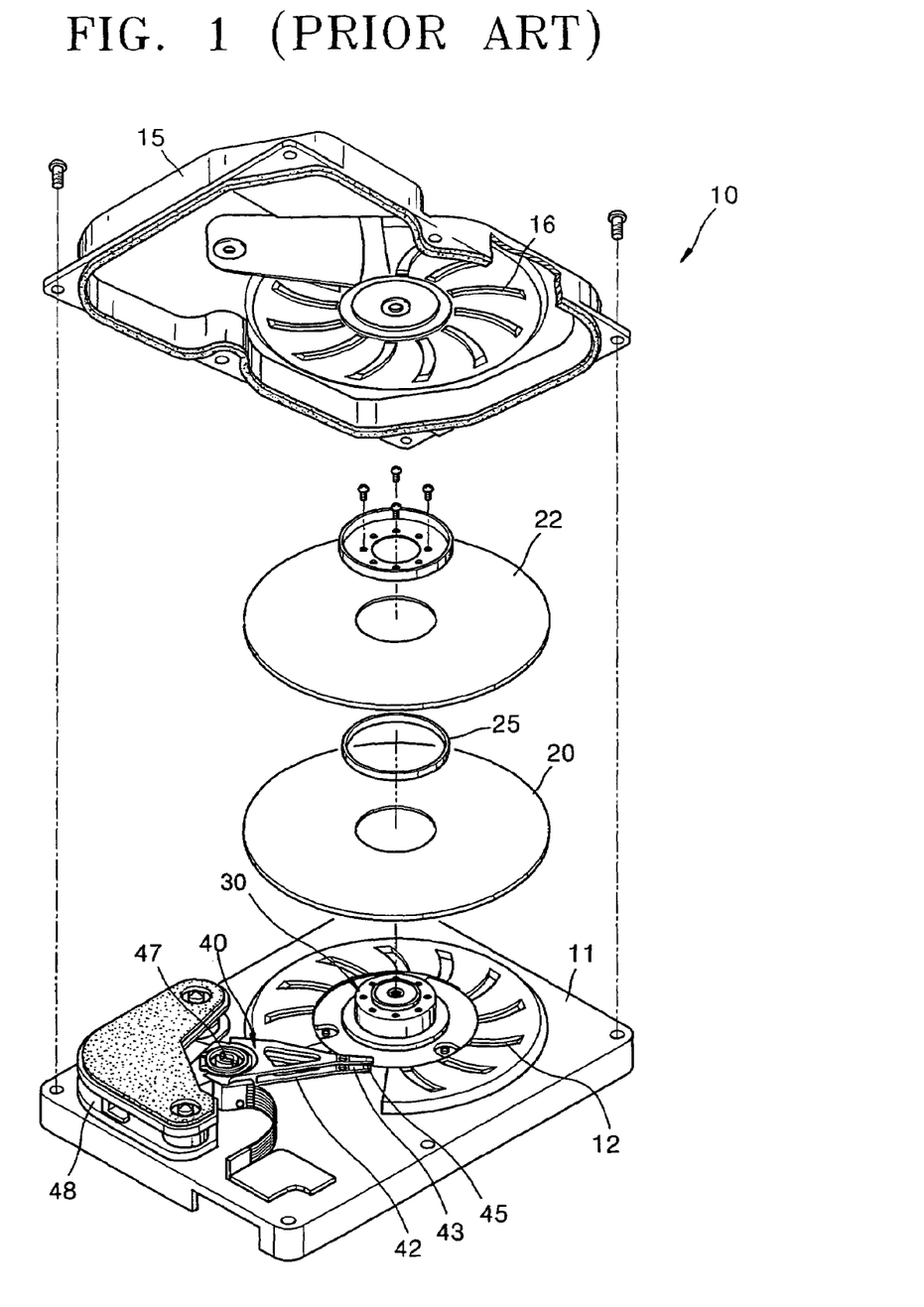
FIG. 1 illustrates an exploded perspective view of a conventional hard disk drive (HDD)

FIG. 1 is an exploded perspective view of a conventional HDD disclosed in Korean Patent Publication No. 2003-68261.

Referring to FIG. 1, a HDD 10 includes a pair of disks 20 and 22, which are data recording media having a spacer 25 therebetween, a spindle motor 30 that is installed on a base member 11 and rotates the disks 20 and 22, an actuator 40 that includes a magnetic head (not shown) for recording or reproducing data on the disks 20 and 22 and for moving the magnetic head, and a cover member 15 that is attached to the base member 11 to protect the disks 20 and 22, the spindle motor 30, and the actuator 40 on the base member 11.

The disks 20 and 22 are fixed on a rotor of the spindle motor 30 so as to rotate relative to the base member 11. Servo signals indicating positions of data recorded or to be recorded are previously recorded on tens of thousands of tracks on surfaces of the respective disks 20 and 22 along the circumferences of the disks 20 and 22.

The actuator 40, which is driven by a voice coil motor 48, rotates around a pivot bearing 47 that is installed on the base member 11. The actuator 40 includes a swing arm 42 that is pivotably coupled to the pivot bearing 47, and a suspension 43 that elastically biases a slider 45, on which the magnetic head is mounted, toward the surfaces of the respective disks 20 and 22.

If the HDD 10 is turned on and the disks 20 and 22 begin to rotate, a lifting force is generated due to an air pressure difference. Accordingly, the slider 45 is maintained over the surfaces of the respective disks 20 and 22 at a height where the lifting force generated from the rotation of the disks 20 and 22 is equal to an elastic force of the suspension 43. Consequently, the magnetic head mounted on the slider 45 records or reproduces data on the disks 20 and 22 while maintaining a predetermined distance from the respective disks 20 and 22.

As such, the conventional HDD 10 suffers from vibrations due to structural defects of the spindle motor 30, assembly errors of the disks 20 and 22, and turbulent air flow in the HDD 10, for example. Such vibrations cause position error signals (PESs) and negatively affect recording and reproducing operations of the HDD 10.

A recent attempt to use a hydrodynamic bearing in the spindle motor 30 of the HDD has considerably reduced vibrations in comparison to spindle motors using ball bearings. Accordingly, turbulent air flow from the high speed rotation of the disks 20 and 22 has become the primary cause of vibrations of the HDD 10. Several approaches have been made to suppress the turbulent air flow, for example, by forming grooves 12 and 16 on surfaces of the base member 11 and the cover member 15, which face the disks 20 and 22, respectively. Another method includes forming a blade (not shown). However, if the grooves 12 and 16 or the blade is applied to the HDD 10 as shown in FIG. 1, the grooves 12 and 16 or the blade would still only fail to control the air flow between the inner surfaces of the disks 20 and 22, which do not respectively face the base member 11 and the cover member 15. In addition, neither grooves 12 and 16, nor the blade, suppress vibrations of the actuator 40.

SUMMARY OF THE INVENTION

The present invention provides a hard disk drive (HDD), which prevents turbulence by disposing a damper, on which grooves are formed, between stacked disks.

Additional aspects and/or advantages of the invention will be set forth in part in the description which follows and, in part, will be obvious from the description, or may be learned by practice of the invention.

To achieve the above and/or other aspects and advantages, embodiments of the present invention set forth a hard disk drive including a housing including a base member attached to a cover member, a plurality of disks rotatably stacked on the base member and spaced apart from one another, an actuator pivotably installed on the base member and fixedly supporting, on its leading end, a slider on which a magnetic head for recording or reproducing data to or from the disks is mounted, and a damper disposed between two of the plurality of stacked disks, wherein a groove is formed on at least one surface of the damper respectively facing at least one of the two disks.

A depth of the groove may range from $1/10$ to $1/3$ of a thickness of the damper or a width of the groove may range from $1/20$ to $3/20$ of a width of the damper. In addition, a plurality of adjacent grooves may be formed on the at least one surface of the damper, and a gap between the adjacent grooves may range from $1/10$ to $1/2$ of the width of the damper.

Further, if a rotational axis of the at least one disk is chosen as an origin and a pair of virtual straight lines intersecting each other are drawn to divide a corresponding plane into four sections, a center of curvature of the groove is positioned in a quadrant symmetric with respect to an origin to a quadrant in which a pivot axis of the actuator is positioned and a radius of curvature of the groove is greater than a radius of the disk. An angle formed between a tangent line contacting an outer peripheral surface of the damper at the groove and a line extending a terminal end of the groove that meets the tangent line may range from 10 to 45 degrees.

The damper may be mounted on the base member so as to not contact the two disks or disturb the rotation of the actuator. The damper may have a "C" shape thereby facing only a portion of the surface area of the respective at least one of the two disks. Accordingly, the groove can suppress turbulence generated by the rotation of at least one of the two disks. The groove may also be one of a plurality of radial grooves suppressing turbulence.

The plurality of radial grooves may be formed only on a portion of the damper adjacent to the actuator. The plurality of radial grooves may also be formed only on a portion of the damper not adjacent to the actuator.

To achieve the above and/or other aspects and advantages, embodiments of the present invention set forth a disk drive turbulence suppression method, including rotating a plurality of disks rotatably stacked on a base member and spaced apart from one another, and dampening turbulence between at least two of the plurality of stacked disks, comprising channeling air through at least one groove formed on at least one surface of at least one damper respectively facing at least one of the two disks.

The disk drive may be a hard disk drive. Further, the method may include pivoting an actuator fixedly supporting, on its leading end, a slider on which a magnetic head for recording or reproducing data to or from at least one of the plurality of disks is mounted.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6 and 7 illustrate graphs of CFD results for the HDDs illustrated in FIG. 5, wherein FIG. 6 illustrates turbulence in an inlet line and FIG. 7 illustrates turbulence in an outlet line.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
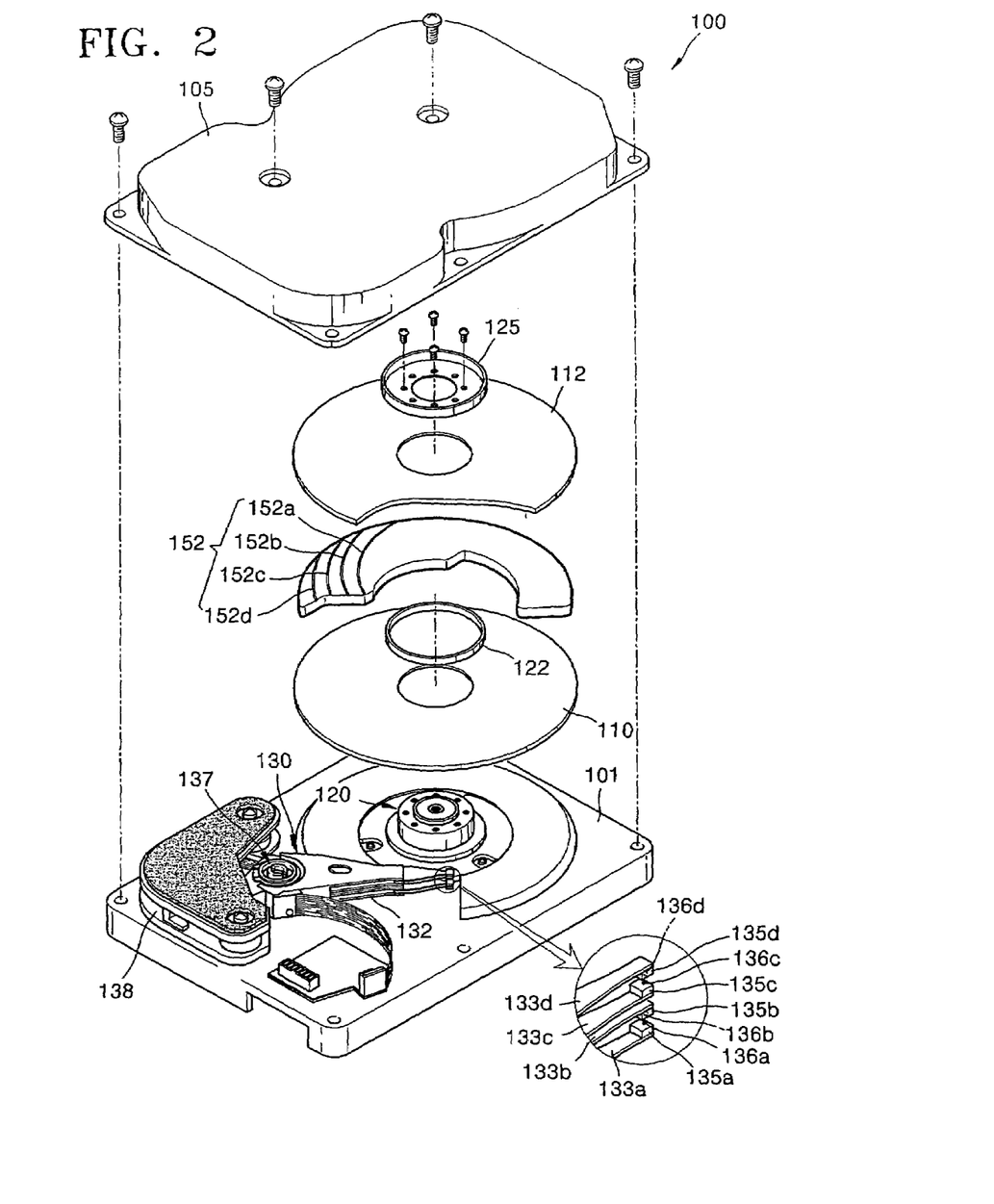
FIG. 2 illustrates an exploded perspective view of an HDD, according to an embodiment of the present invention.
Figure 3:
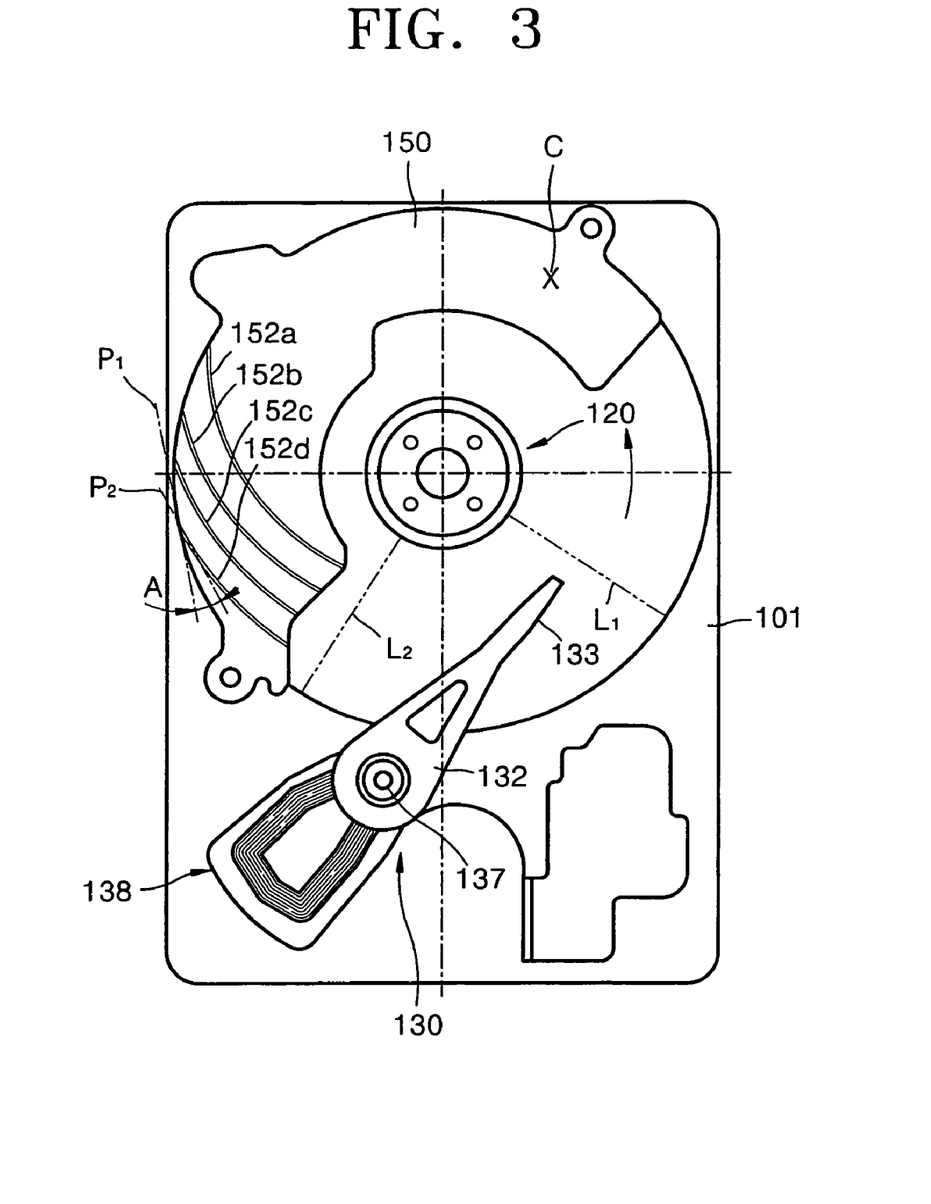
FIG. 3 illustrates a plan view of a damper for the HDD shown in FIG. 2, according to an embodiment of the present invention.

FIG. 2 illustrates an exploded perspective view of a hard disk drive (HDD), according to an embodiment of the present invention. Similarly, FIG. 3 illustrates a top plan view of a damper for the HDD shown in FIG. 2, and FIG. 4 illustrates a sectional view of the HDD shown in FIG. 2.

Figure 4:
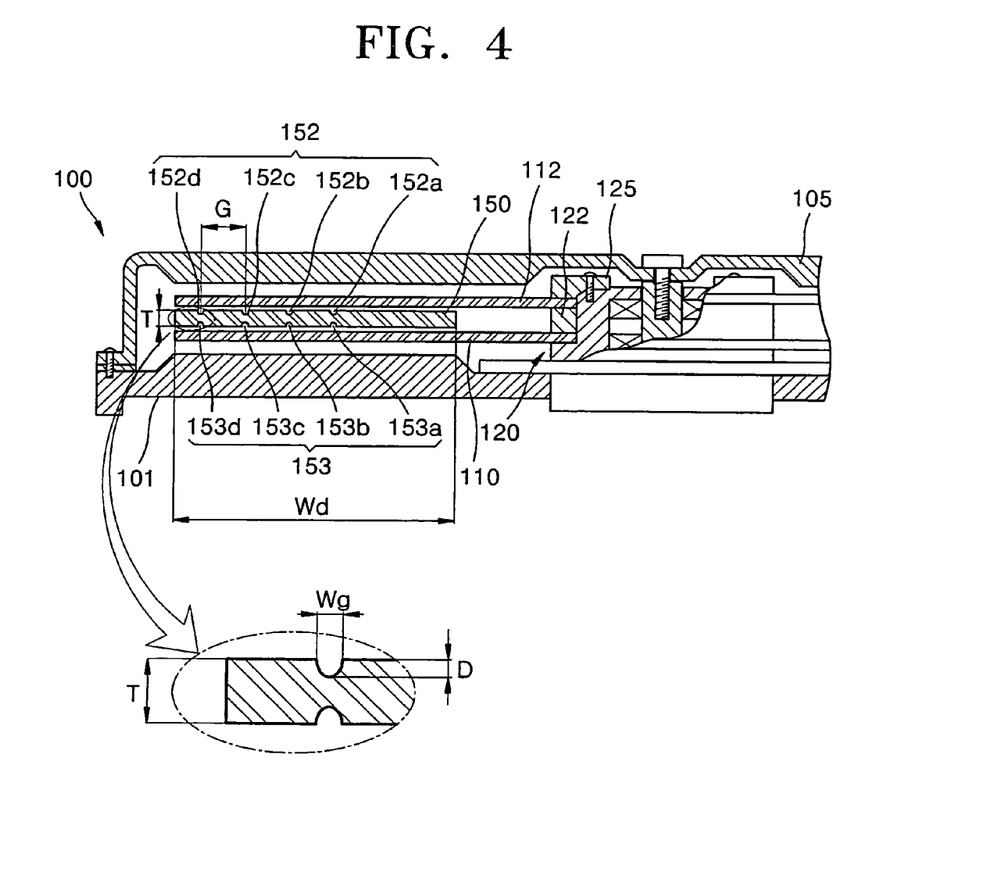
FIG. 4 illustrates a sectional view of the HDD shown in FIG. 2.

Referring to FIGS. 2 and 4, a HDD 100 includes a housing, formed by attaching a cover member 105 to a base member 101, with a predetermined inner space therein. First and second disks 110 and 112, a spindle motor 120, an actuator 130, and a damper 150 reside within the housing.

The housing includes the base member 101 that supports the spindle motor 120 and the actuator 130, and the cover member 105 which is attached to the base member 101 to protect the disks 110 and 112. The housing is generally made of stainless steel or aluminium.

The first and second disks 110 and 112 are mounted inside the housing. Four or more disks have been mounted in a HDD in order to increase data storage capacity, but with the recent drastic increase in surface recording density, one or two disks can store a sufficient amount of data. Accordingly, HDDs having only one or two disks have been mainly used in recent years.

The spindle motor 120 rotates the first and second disks 110 and 112, and is fixed on the base member 101. A ring-shaped spacer 122 is inserted between the first and second disks 110 and 112 to maintain a space between the two disks 110 and 112. A disk clamp 125 is screwed to a top portion of the spindle motor 120 to prevent separation of the disks 110 and 112.

The actuator 130 is used to record or read data on the disks 110 and 112, and is pivotably installed on the base member 101. The actuator 130 includes a swing arm 132 rotating around a pivot bearing 137, first through fourth suspensions 133a, 133b, 133c, and 133d coupled to a leading end portion of the swing arm 132, and first through fourth sliders 135a, 135b, 135c, and 135d, supported by the suspensions 133a, 133b, 133c, and 133d, respectively. First through fourth magnetic heads 136a, 136b, 136c, and 136d, for recording and reproducing data, are mounted on the sliders 135a, 135b, 135c, and 135d, respectively. Further, a voice coil motor (VCM) 138 provides a rotating force for rotating the swing arm 132 around the pivot bearing 137. The VCM 138 can be controlled by a servo control system, and rotates the swing arm 132 in a direction defined by Fleming's Left Hand Rule due to an interaction between current input to a VCM coil and a magnetic field formed by magnets. Accordingly, the four sliders 135a, 135b, 135c, and 135d, attached to leading ends of the suspensions 133a, 133b, 133c, and 133d, respectively, are moved over the first and second disks 110 and 112 toward the spindle motor 120 or toward outer peripheries of the disks 110 and 112.

The HDD 100 according to embodiments of the present invention employs a damper 150, which is disposed between the rotating disks 110 and 112 to suppress vibrations and noise caused by the rotation of the disks 110 and 112. Upper and lower grooves 152 and 153 are formed on top and bottom surfaces of the damper 150, respectively facing the disks 110 and 112. The damper 150 can be made of metal, such as aluminium, and is mounted on the base member 101 so as to not contact the disks 110 and 112. Further, the damper 150 is out of the scope of activity of the actuator 130, so as not to disturb the rotation of the actuator 130, and has a "C" shape, thereby facing about half of the surface areas of the respective disks 110 and 112.

Focusing on FIG. 4, it is preferable that a depth D of the respective grooves 152 and 153 range from $1/10$ to $1/3$ of a thickness T of the damper 150. The grooves 152 and 153 guide air flow, which rotates counterclockwise, shown by an arrow in FIG. 3, to suppress turbulence generated by the rotation of the disks 110 and 112. If the depth D of the grooves 152 and 153 is less than $1/10$ of the thickness T of the damper 150, the grooves 152 and 153 cannot guide the air flow satisfactorily, and if the depth D is greater than $1/3$ of the thickness T, the stiffness of the damper 150 deteriorates.

In addition, it is preferable, though not necessary, that a width Wg of the respective grooves 152 and 153 range from $1/20$ to $3/20$ of a width Wd of the damper 150. If the width Wg of the grooves 152 and 153 is less than $1/20$ of the width Wd of the damper 150, the grooves 152 and 153 cannot guide the air flow satisfactorily, and if the width Wg is greater than $3/20$ of the width Wd, the stiffness of the damper 150 may deteriorate.

Also, it is preferable, though not necessary, that a plurality of grooves 152a through 152d, of grooves 152, be formed on the top surface of the damper 150 and a plurality of grooves 153a through 153d, of grooves 153, be formed on the bottom surface of the damper 150, with a gap G between adjacent grooves ranging from ⅒ to ½ of the width Wd of the damper 150. If the gap G between the adjacent grooves is less than ⅒ of the width Wd of the damper 150, the stiffness of the damper 150 may deteriorate, and if the gap G is greater than ½ of the width Wd, the number of grooves is reduced and thus the grooves 152 and 153 cannot guide the air flow satisfactorily.

Referring to FIG. 3, if the spindle motor 120, which functions as a rotational axis for the disks 110 and 112, is chosen as the origin and a pair of virtual straight lines, which are perpendicular to a side surface of the base member 101 and perpendicularly intersect each other, are drawn to divide a plane on which the grooves 152 and 153 are formed into four sections, it is preferable that a center of curvature C of the grooves 152 and 153 be in a quadrant symmetric with respect to the origin to a quadrant in which the pivot bearing 137, which functions as a pivot axis of the actuator 137, is positioned, and a radius of curvature of the grooves 152 and 153 be greater than a radius of the disks 110 and 112. The air flow rotating counterclockwise, as shown by the arrow, is formed on the surfaces of the disks due to the rotation of the disks 110 and 112. The guidance of the air flow to the spindle motor 120, which is the rotational axis of the disks 110 and 112, depends on the shapes of the grooves 152 and 153.

Furthermore, it is preferable, though not necessary, that an angle A formed between a tangent line P1 contacting an outer peripheral surface of the damper 150 at a terminal end of a groove and an extension line P2 of the terminal end of the groove that meets the tangent line P1 range from 10 to 45 degrees. If the angle A is less than 10 degrees, the grooves 152 and 153 may not satisfactorily guide the counterclockwise air flow to the spindle motor 120, and if the angle A is greater than 45 degrees, the counterclockwise air flow can be disturbed, thereby causing turbulence.

Figure 5:
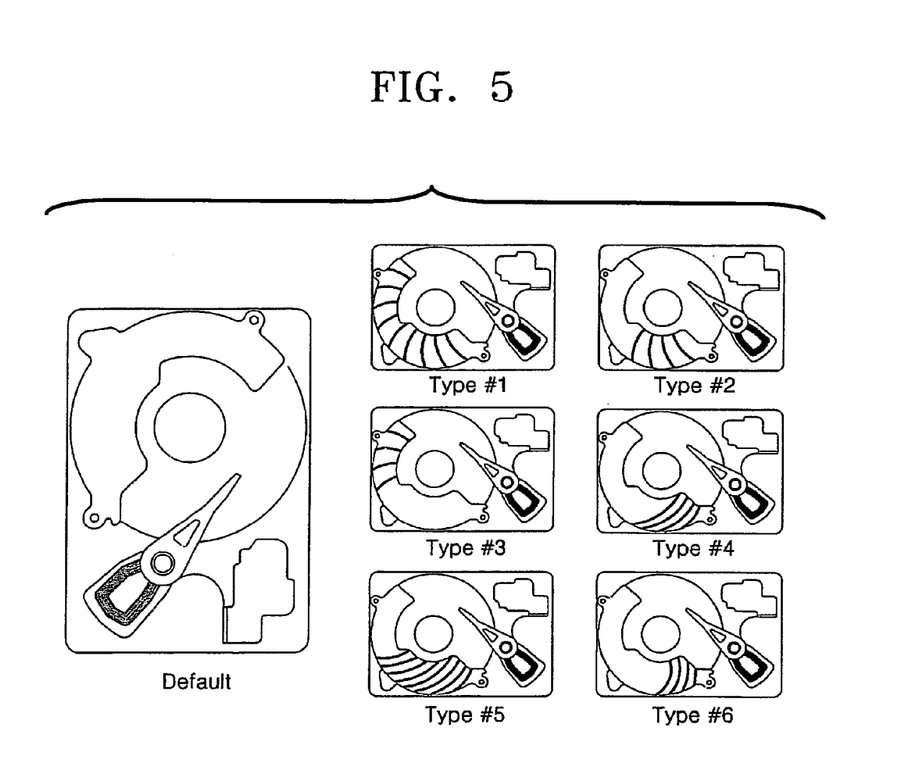
FIG. 5 illustrates plan views of a conventional HDD and various embodiments of the present invention, adopted for turbulence comparison using a computational fluid dynamics (CFD) program.
Figure 6:
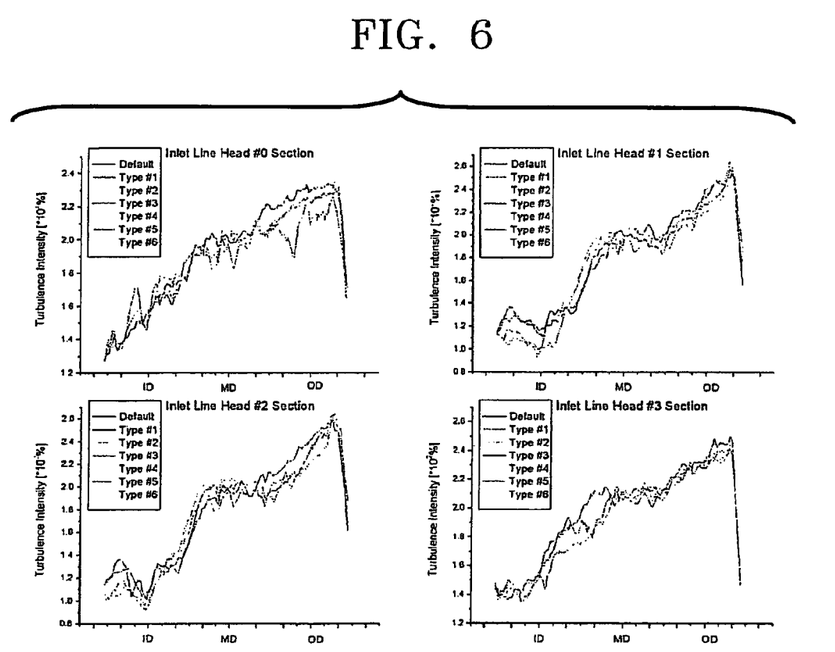
Figure 7:
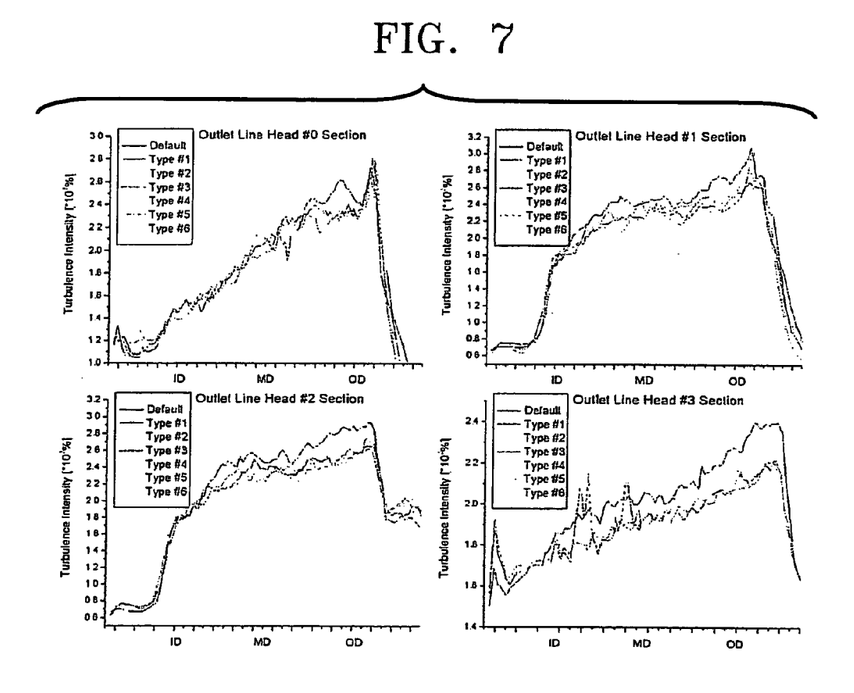

A computational fluid dynamics (CFD) analysis was performed to verify the effects of embodiments of the present invention. FIG. 5 illustrates plan views of a conventional HDD and various embodiments of the present invention, adopted for turbulence comparison using CFD. FIGS. 6 and 7 illustrate graphs of the CFD results for the HDDs illustrated in FIG. 5, with FIG. 6 illustrating the turbulence in an inlet line, and FIG. 7 illustrating the turbulence in an outlet line.

Referring to FIG. 5, an HDD Default includes a damper, which is disposed between a plurality of disks, having no grooves thereon. A HDD Type #1 includes a damper on which radial grooves are formed, a HDD Type #2 has radial grooves formed only on a portion, adjacent to an actuator, of a damper, a HDD Type #3 has radial grooves formed only on a portion of a damper far away from an actuator, and a HDD Type #4 is the HDD, according to embodiments of the present invention illustrated in FIGS. 2 through 4. Further, a HDD Type #5 is similar to the HDD Type #4, but has grooves formed over a wider area, and a HDD Type #6 is similar to the HDD Type #4 but has a greater angle formed between the tangent line contacting the outer peripheral surface of a damper at a groove and the line extending the terminal end of the groove meeting the tangent line.

It is assumed that a virtual line positioned before the air flow enters the damper in the HDDs Default is an inlet line L1 and a virtual line positioned after the air flow goes out of the damper is an outlet line L2, as illustrated in FIG. 2. In the same manner, it is assumed that a virtual line positioned before the airflow enters the damper in each of the HDDs Types #1 through #6 is an inlet line L1 and a virtual line positioned after the airflow goes out of the damper is an outlet line L2. Turbulence in the inlet line and the outlet line of each HDD was calculated using CFD analysis under the following conditions.

1) Angular velocity of disk: 7200 rpm
2) Operating condition: 1 atm, room temperature
3) Fluid type: air (dynamic viscosity coefficient $\upsilon=0.15$ cm$^2$/s)
4) Analyzed as a steady state (Energy equatin is ignorable)
5) k-ε RNG 3D Model of turbulence The graphs of FIG. 6 illustrate turbulence intensity (TI) in the inlet line of each HDD obtained through CFD analysis, and the graphs of FIG. 7 illustrate TI in the outlet line of each HDD obtained through CFD analysis. In the graphs, ID represents an inner disk closer to a rotational axis of the disks, MD represents a middle disk, and OD represents an outer disk farther from the rotational axis. Heads #0, #1, #2, and #3 represent a lowermost head through an uppermost head, respectively. Here, the TI is calculated by dividing the fluid velocity fluctuation by its mean value.

In order to more easily grasp the results shown in FIGS. 6 and 7, Tables 1 through 3 are provided below. In Tables 1 and 2, "TI average" represents an average value of the TI's of each of the HDDs Default and Types #1 through #6 in the graphs of FIGS. 6 and 7, and "Change Rate" is defined as follows:

$$\text{Change rate } (\%) = \frac{TI\ avg\ \text{of default} - TI\ avg\ \text{of type}}{TI\ avg\ \text{of default}}$$

Further, "Standard Deviation" in Tables 1 and 2 is a standard deviation for each of the HDDs Default and Types #1 through #6.

TABLE 1

| | Inlet line | Default | Type #1 | Type #2 | Type #3 | Type #4 | Type #5 | Type #6 |
|---|---|---|---|---|---|---|---|---|
| Head #0 | TI average | 194.7657 | 186.5883 | 190.8714 | 189.5981 | 192.944 | 191.463 | 191.1437 |
| | Change rate | 0 | −4.19857 | −1.99949 | −2.65322 | −0.93533 | −1.69572 | −1.85967 |
| | Standard deviation | 31.51302 | 24.19299 | 27.91278 | 28.62776 | 27.53196 | 28.35418 | 27.03744 |
| Head #1 | TI average | 183.9201 | 178.3078 | 175.8674 | 176.2308 | 174.6578 | 177.5943 | 174.7703 |
| | Change rate | 0 | −3.05149 | −4.37839 | −4.18081 | −5.03608 | −3.43941 | −4.97486 |
| | Standard deviation | 43.12308 | 46.98242 | 46.52182 | 41.78871 | 43.54715 | 44.85232 | 49.28575 |
| Head #2 | TI average | 183.6983 | 177.1293 | 180.2242 | 179.6015 | 178.3967 | 181.5897 | 178.7589 |
| | Change | 0 | −3.57593 | −1.89119 | −2.23014 | −2.88599 | −1.14784 | −2.68884 |

TABLE 1-continued

| | Inlet line | Default | Type #1 | Type #2 | Type #3 | Type #4 | Type #5 | Type #6 |
|---|---|---|---|---|---|---|---|---|
| | rate | | | | | | | |
| | Standard deviation | 46.01325 | 46.19382 | 47.72139 | 44.15274 | 45.27681 | 45.81867 | 50.11549 |
| Head #3 | TI average | 201.9355 | 193.0813 | 196.9622 | 196.01 | 196.9125 | 197.277 | 197.1743 |
| | Change rate | 0 | −4.38468 | −2.46281 | −2.93433 | −2.48743 | −2.30692 | −2.35775 |
| | Standard deviation | 31.76105 | 32.79144 | 31.33942 | 29.77226 | 31.67933 | 31.59205 | 30.95772 |

TABLE 2

| | Outlet line | Default | Type #1 | Type #2 | Type #3 | Type #4 | Type #5 | Type #6 |
|---|---|---|---|---|---|---|---|---|
| Head #0 | TI average | 171.338 | 164.5775 | 163.1553 | 166.0281 | 165.2523 | 163.8397 | 163.6395 |
| | Change rate | 0 | −3.94575 | −4.77577 | −3.09911 | −3.55191 | −4.37635 | −4.49319 |
| | Standard deviation | 68.65598 | 64.48043 | 68.04785 | 65.66888 | 64.87574 | 66.06996 | 66.32221 |
| Head #1 | TI average | 144.0742 | 147.0712 | 143.3129 | 141.2875 | 138.1034 | 139.6185 | 140.633 |
| | Change rate | 0 | 2.080199 | −0.52836 | −1.93421 | −4.14424 | −3.09263 | −2.38845 |
| | Standard deviation | 106.8203 | 98.93155 | 95.10034 | 94.68.54 | 96.33217 | 95.53991 | 96.38253 |
| Head #2 | TI average | 153.8928 | 154.68 | 154.4524 | 151.3695 | 149.0257 | 151.0179 | 154.9267 |
| | Change rate | 0 | 0.511502 | 0.36359 | −1.63964 | −3.16265 | −1.86814 | 0.671799 |
| | Standard deviation | 107.0405 | 94.29507 | 97.02284 | 95.98765 | 95.41825 | 94.12437 | 96.13367 |
| Head #3 | TI average | 149.4425 | 139.0238 | 139.3473 | 136.5383 | 136.5859 | 137.7741 | 138.4413 |
| | Change rate | 0 | −6.97171 | −6.75523 | −8.63492 | −8.60307 | −7.80799 | −7.3615 |
| | Standard deviation | 82.50806 | 78.68553 | 79.4718 | 79.5611 | 81.12308 | 80.07377 | 78.76237 |

TABLE 3

| | Default | Type #1 | Type #2 | Type #3 | Type #4 | Type #5 | Type #6 |
|---|---|---|---|---|---|---|---|
| Sum of change rates | 0 | −23.5364 | −22.4277 | −27.3064 | −30.8067 | −25.735 | −25.4525 |

It can be seen from Tables 1 through 3 that a "sum of change rates" for each of the HDDs Types #1 through #6 is smaller than that of the HDD Default. This means that less turbulence is created in the air flow in the HDDs Types #1 through #6, and accordingly, it can be expected that vibrations of the disks and actuator will similarly be reduced.

In particular, a sum of the HDD Type #4 is over 30% lower than that of the HDD Default, and a sum of each of the other remaining HDDs is 3-8% lower than that of the HDD Default. Additionally, it can be seen that change rates at the heads #1 and #2 are the minimum values. Accordingly, it can be appreciated that the HDD Type #4 is superior to the other HDDs, Default and Types #1, #2, #3, #5, and #6. Specifically, the HDD Type #4 is superior in suppressing turbulent air flow between inner surfaces of the disks, which do not face a base member and a cover member.

As described above, since the HDD, according to embodiments of the present invention, reduces the turbulence in the air flow inside the housing, vibrations of the disks and the actuator can be reduced. Consequently, position error signals can similarly be reduced, and data recording and reproducing operations of the HDD will be improved.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the HDD may have a plurality of disks, and dampers with grooves may be disposed between two adjacent disks of the plurality of disks. Accordingly, the scope of the present invention is defined only by the appended claims.

What is claimed is:

1. A hard disk drive comprising:
a housing including a base member attached to a cover member;
a plurality of disks rotatably stacked on the base member and spaced apart from one another;
an actuator pivotably installed on the base member and fixedly supporting, on its leading end, a slider on which a magnetic head for recording or reproducing data to or from the disks is mounted; and a damper disposed between two of the plurality of stacked disks, wherein one or more grooves are formed on at least one surface of the damper respectively facing at least one of the two disks, with at least one of the grooves traversing from an inner periphery of the damper to an outer periphery of the damper to guide an air flow of channeled air in the at least one groove, and with a rotational axis of the at least one disk being an origin and a pair of virtual straight lines intersecting each other being drawn to divide a corresponding plane into four sections, a center of curvature of the one or more grooves is positioned in a quadrant symmetric with respect to an origin to a quadrant in which a pivot axis of the actuator is positioned and a radius of curvature of the groove is greater than a radius of the disk.

2. The hard disk drive of claim 1, wherein a depth of the one or more grooves ranges from $1/10$ to $1/3$ of a thickness of the damper.

3. The hard disk drive of claim 1, wherein a width of the one or more grooves ranges from $1/20$ to $3/20$ of a width of the damper.

4. The hard disk drive of claim 1, wherein a plurality of adjacent grooves are formed on the at least one surface of the damper, and a gap between the adjacent grooves ranges from $1/10$ to $1/2$ of the width of the damper.

5. The hard disk drive of claim 1, wherein an angle formed between a line tangent to an outer peripheral surface of the damper at a terminal end of a respective groove and a line extending from the terminal end of the respective groove across the line tangent to the outer peripheral surface of the damper ranges from 10 to 45 degrees.

6. The hard disk drive of claim 1, wherein the damper is mounted on the base member so as to not contact the two disks or disturb the rotation of the actuator.

7. The hard disk drive of claim 1, wherein the damper has a "C" shape thereby facing only a portion of the surface area of the respective at least one of the two disks.

8. The hard disk drive of claim 1, wherein the one or more grooves suppress turbulence generated by the rotation of at least one of the two disks.

9. The hard disk drive of claim 1, wherein the one or more grooves are one of a plurality of radial grooves suppressing turbulence, with the radial grooves changing in radius in a spiraling direction of a respective disk of the plurality of disks.

10. The hard disk drive of claim 9, wherein the plurality of radial grooves are formed only on a portion of the damper adjacent to the actuator.

11. The hard disk drive of claim 9, wherein the plurality of radial grooves are formed only on a portion of the damper not adjacent to the actuator.

12. The hard disk drive of claim 1, wherein the at least one of the grooves extends from an inner periphery edge of the damper to an outer periphery edge of the damper.

13. A disk drive turbulence suppression method, comprising:

rotating a plurality of disks rotatably stacked on a base member and spaced apart from one another; and dampening turbulence between at least two of the plurality of stacked disks, comprising channeling air through at least one groove formed on at least one surface of at least one damper respectively facing at least one of the two disks, with channeling of air being performed by the at least one groove respectively traversing from an inner periphery of the at least one damper to an outer periphery of the at least one damper, guiding the flow direction of the channeled air, wherein, with a rotational axis of the at least one disk being chosen as an origin and a pair of virtual straight lines intersecting each other being drawn to divide a corresponding plane into four sections, a center of curvature of the groove is positioned in a quadrant symmetric with respect to an origin to a quadrant in which a pivot axis of an actuator is positioned and a respective radius of curvature of the at least one groove is greater than a radius of the disk.

14. The method of claim 13, wherein a depth of the at least one groove ranges from $1/10$ to $1/3$ of a thickness of the damper.

15. The method of claim 13, wherein a width of the at least one groove ranges from $1/20$ to $3/20$ of a width of the damper.

16. The method of claim 13, wherein a plurality of adjacent grooves are formed on the at least one surface of the at least one damper, and a gap between the adjacent grooves ranges from $1/10$ to $1/2$ of the width of the at least one damper.

17. The method of claim 13, wherein the disk drive is a hard disk drive.

18. The method of claim 17, further comprising pivoting an actuator fixedly supporting, on its leading end, a slider on which a magnetic head for recording or reproducing data to or from at least one of the plurality of disks.

19. The method of claim 13, wherein the at least one of the grooves respectively extends from an inner periphery edge of the at least one damper to an outer periphery edge of the at least one damper.

20. A disk drive turbulence suppression method, comprising:

rotating a plurality of disks rotatably stacked on a base member and spaced apart from one another; and dampening turbulence between at least two of the plurality of stacked disks, comprising channeling air through at least one groove formed on at least one surface of at least one damper respectively facing at least one of the two disks, wherein an angle formed between a tangent line contacting an outer peripheral surface of the damper at the groove and a line extending a terminal end of the groove that meets the tangent line ranges from 10 to 45 degrees.

21. A disk drive turbulence suppression method, comprising:

rotating a plurality of disks rotatably stacked on a base member and spaced apart from one another; and dampening turbulence between at least two of the plurality of stacked disks, comprising channeling air through at least one groove formed on at least one surface of at least one damper respectively facing at least one of the two disks, with channeling of air being performed by the at least one groove respectively traversing from an inner periphery of the at least one damper to an outer periphery of the at least one damper, guiding the flow direction of the channeled air, wherein an angle formed between a line tangent to an outer peripheral surface of the at least one damper at a terminal end of a respective groove and a line extending from the terminal end of the respective groove across the line to the outer peripheral surface of the at least one damper ranges from 10 to 45 degrees.

* * * * *